United States Patent Office 2,730,802
Patented Jan. 17, 1956

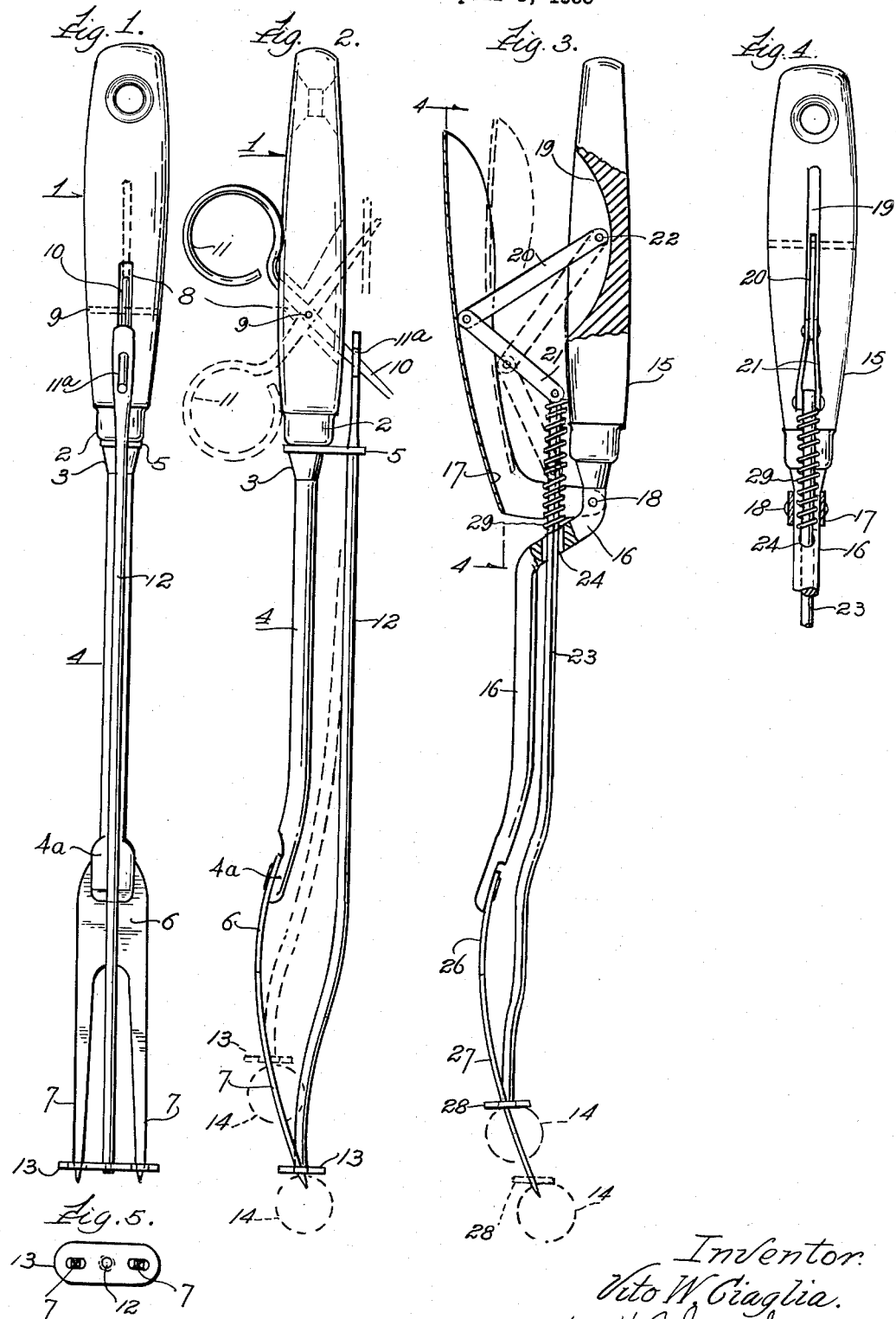

2,730,802

EJECTOR FORKS

Vito W. Ciaglia, Chicago, Ill.

Application April 3, 1953, Serial No. 346,758

2 Claims. (Cl. 30—129)

This invention relates to forks and more particularly to forks of the type designed for use in the kitchen, in the dining room and elsewhere where food may be handled and/or eaten. The fork has for a principal purpose the provision of means for picking up certain articles of food such as pickles, olives, potatoes and the like, as from a plate, jar or other receptacle, one article at a time and thereafter discharging the article where desired; or in the case of articles of food that may be peeled, buttered, seasoned or the like the article may be securely held while such operation is being performed and thereafter eaten from the fork or discharged into another food receptacle for use later, etc.

A further object is to provide a food pick-up and ejector fork of simple construction that may be used easily with one hand, that is of few parts, that is positive and efficient in use and that, in one form, is free from springs of any kind and one wherein all parts are exposed for easy cleaning, polishing, etc. and that is inexpensive to manufacture.

Other and additional objects of the instant invention will become more apparent from the following description, defined in the claims, and understood from the accompanying drawing forming part of this disclosure, and wherein:

Fig. 1 is an inverted plan view of an ejector fork according to the instant invention.

Fig. 2 is a side elevational view of the fork of Fig. 1, altered positions of adjustable parts being denoted in broken lines, as well as a small object impaled upon the fork.

Fig. 3 is a view partly in side elevation and partly in section of a modified form of the fork of Figs. 1 and 2.

Fig. 4 is a fragmentary view, partly in section, of the fork of Fig. 3, taken substantially on the line 4—4 of of Fig. 3, and, Fig. 5 is a face view of a stripper plate employed.

Referring now to Figs. 1 and 2 the reference numeral 1 denotes an elongated handle to a reduced end of which the ferrule 2 is secured and between same and the slightly flared portion 3 of the fork shank 4 a guide-finger 5 is secured upon a reduced rod-like portion of said shank that extends into and is made fast to said handle 1 in conventional manner. To the end of the shank remote from said handle the shank 4 is flattened at 4a somewhat and secured to the fork-head 6 bifurcated to provide tines 7. The said guide-finger 5 extends upwardly from said shank 4 while the flattened end of said shank extends downwardly slightly upon the opposite side of said shank with respect to said guide-finger. The head 6, with its tines 7, is substantially dish-shaped with the tine terminals in elevated position with respect to the opposite end of said head when the fork is held in substantially horizontal position.

The handle 1 is formed with an elongated axial slot 8 through which at right angles thereto the pin 9 extends to which the actuating lever 10 is fulcrumed that extends above and below the handle 1 and at one end terminates in the finger-ring 11, said lever above said handle 1 with respect to the ring 11 extending through a perforation 11a in the reciprocating rod 12 that extends through a perforation in said guide-finger 5, said rod 12 extending substantially parallel to said shank 4 to the head 6 and longitudinally thereof in spaced relation thereto, said rod finally curved toward said head and made fast to the stripper plate 13 slidably arranged upon said tines.

To use the fork the rod 12 is moved by the ring and lever 11, 10 from full line to broken line position, Fig. 2, and the object is impaled upon the tines 7 and thereafter may be engaged and removed from the tines by movement of said ring to full line position.

It will be noted that the handle 1 is of such length that with its free end received in the palm of the hand between the thumb and two adjacent fingers the ring 11 may be readily engaged and moved back and forth by the forefinger thus permitting full use of the fork with one hand.

Referring now to Figs. 3, 4 and 5 the handle 15 is secured to the angular shank 16 to which the actuating lever 17, trough shape, is secured by pin 18. The handle 15 is formed with a deep recess 19 in which one end of linkage 20, 21 is pivotally secured by pin 22, the opposite end of said linkage pivotally connected to one end of the rod 23 extending freely through a guide slot 24 in shank 16, said rod extending longitudinally of and in slight spaced relation to a portion of said shank 16 and to the fork head 26 connected to said shank and bifurcated to form tines 27 upon which the stripper plate 28 is operatively received and made fast to the end of said shank.

A return spring 29 arranged upon rod 23 engages one end of link 21 and the shank 23. With the handle 15 and lever 17 held in the hand and a slight pressure exerted upon said members the lever is moved into engagement with the said linkage which is made to ride frictionally along the trough-shaped lever forcing the rod 23 toward the free ends of the tines 27 against the tension of, and compressing, the spring 29. When pressure is released the spring will return the parts to normal position and, obviously, an object 14 may be impaled by the tines and thereafter ejected by said stripper plate.

What is claimed is:

1. In an ejector fork, an elongated recessed handle, an angular transversely slotted shank carried by said handle, said shank mainly disposed to one side of said handle, the slot in said shank substantially parallel to said handle, a fork head at one end of said shank, a trough-shaped actuating lever pivotally connected to said shank and extending mainly longitudinally of the recessed portion of said handle in spaced relation thereto with its open face adjacent said handle recess, a reciprocating rod actuated by said lever and extending through the slot in said shank and guided thereby and extending longitudinally of and spaced from said handle, fork head and said shank beyond its slotted portion, linkage fulcrumed in the recessed portion of said handle, pivotally connected to said rod and slidably engaging said trough shaped lever, a stripper plate carried by said rod movable over said fork head, and a return spring upon said rod engaging the slotted portion of said shank and one end of said linkage yieldingly actuating said linkage to retain said lever the maximum distance from said handle.

2. In an ejector fork, a recessed handle, an angular transversely slotted shank carried by said handle, a fork head at one end of said shank, a trough shaped actuating lever pivotally connected to said shank in opposed relation to said handle, a reciprocating rod actuated by said lever and extending through the slot in said shank and guided thereby and terminating immediately adjacent said fork head, linkage fulcrumed in the recessed portion of said handle and pivotally connected to said rod, said linkage slidably engaging said trough shaped lever, a stripper plate carried by said rod movable over fork head, and a return spring upon said rod engaging the slotted portion of said shank and one end of said linkage to yieldingly actuate said linkage to maintain said lever the maximum distance from said handle.

References Cited in the file of this patent

UNITED STATES PATENTS

| | | |
|---|---|---|
| 76,835 | Smith | Apr. 14, 1868 |
| 208,354 | Williams | Sept. 24, 1878 |
| 557,016 | Paige | Mar. 24, 1896 |
| 1,255,945 | Stimecz | Feb. 12, 1918 |
| 2,236,606 | Parvu et al. | Apr. 1, 1941 |
| 2,610,347 | Kleiner | Sept. 16, 1952 |

FOREIGN PATENTS

| | | |
|---|---|---|
| 150,487 | Germany | Apr. 16, 1904 |